United States Patent
Huang et al.

(10) Patent No.: US 11,853,674 B2
(45) Date of Patent: Dec. 26, 2023

(54) METHODS AND SYSTEMS FOR INTEGRATED CIRCUIT PHOTOMASK PATTERNING

(71) Applicant: TAIWAN SEMICONDUCTOR MANUFACTURING COMPANY, LTD., Hsinchu (TW)

(72) Inventors: Wei-Hao Huang, Taichung (TW); Chun Ting Lee, Hsinchu (TW); Cheng-Tse Lai, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 39 days.

(21) Appl. No.: 17/585,942

(22) Filed: Jan. 27, 2022

(65) Prior Publication Data
US 2023/0028023 A1   Jan. 26, 2023

Related U.S. Application Data

(60) Provisional application No. 63/224,603, filed on Jul. 22, 2021.

(51) Int. Cl.
*G06F 30/392* (2020.01)
*G03F 7/00* (2006.01)

(52) U.S. Cl.
CPC ........ *G06F 30/392* (2020.01); *G03F 7/70625* (2013.01)

(58) Field of Classification Search
CPC ...... G06F 30/392; G03F 7/70625; G03F 1/38; G03F 1/36
See application file for complete search history.

(56) References Cited

U.S. PATENT DOCUMENTS

| | | | | |
|---|---|---|---|---|
| 6,081,272 | A * | 6/2000 | Morimoto | G06F 30/39 257/E21.244 |
| 8,716,841 | B1 * | 5/2014 | Chang | G03F 1/70 257/632 |
| 8,898,612 | B1 * | 11/2014 | Jain | G06F 30/392 716/122 |
| 9,411,924 | B2 * | 8/2016 | Wang | G03F 1/36 |
| 10,691,864 | B2 | 6/2020 | Wang et al. | |
| 10,990,744 | B2 | 4/2021 | Huang et al. | |
| 11,079,672 | B2 | 8/2021 | Chu et al. | |
| 2005/0257188 | A1 * | 11/2005 | Kotani | G03F 1/36 716/52 |

(Continued)

*Primary Examiner* — Stacy Whitmore
(74) *Attorney, Agent, or Firm* — NZ CARR LAW OFFICE

(57) ABSTRACT

Methods and systems for IC photomask patterning are described. In some embodiments, a method includes inserting a dummy region in an IC design layout, the IC design layout includes an active region, and the active region and the dummy region is separated by a first distance. The method further includes performing one or more operations on the IC design layout, and the active region and the dummy region is separated by a second distance substantially less than the first distance. The method further includes performing a dummy region size reduction on the IC design layout to increase the second distance to a third distance substantially greater than the second distance, and the third distance is substantially greater than a minimum feature size to be patterned by a photolithography tool. The method further includes forming a photomask using the IC design layout.

20 Claims, 4 Drawing Sheets

(56) References Cited

U.S. PATENT DOCUMENTS

| | | | |
|---|---|---|---|
| 2007/0124327 A1* | 5/2007 | Park | G03F 1/68 |
| | | | 707/999.102 |
| 2007/0288879 A1* | 12/2007 | Kobayashi | G06F 30/392 |
| | | | 716/54 |
| 2012/0295187 A1* | 11/2012 | Tsai | H01L 21/0334 |
| | | | 716/55 |
| 2013/0227502 A1* | 8/2013 | Fang | G06F 30/39 |
| | | | 716/102 |
| 2014/0042585 A1* | 2/2014 | Peng | G06F 30/398 |
| | | | 716/112 |
| 2015/0143312 A1* | 5/2015 | Jeon | G03F 1/36 |
| | | | 716/111 |
| 2015/0370942 A1* | 12/2015 | Lin | G03F 1/36 |
| | | | 716/135 |
| 2016/0055281 A1* | 2/2016 | Hamouda | G06F 30/398 |
| | | | 716/51 |
| 2016/0154920 A1* | 6/2016 | Harada | G06F 30/392 |
| | | | 716/124 |
| 2016/0328510 A1* | 11/2016 | Ueberreiter | G06F 30/398 |
| 2017/0090302 A1* | 3/2017 | Slotboom | G03F 7/70633 |
| 2019/0236238 A1* | 8/2019 | Park | G06F 30/392 |
| 2020/0057833 A1* | 2/2020 | Lu | G06F 30/39 |
| 2020/0395366 A1 | 12/2020 | Chen et al. | |
| 2021/0042461 A1* | 2/2021 | Hu | H01L 27/0207 |
| 2021/0326507 A1* | 10/2021 | Lu | G06F 30/39 |
| 2022/0415874 A1* | 12/2022 | Baruah | H01L 27/0207 |
| 2023/0118690 A1* | 4/2023 | Mazo | A41D 13/0568 |
| | | | 2/462 |

\* cited by examiner

US 11,853,674 B2

METHODS AND SYSTEMS FOR INTEGRATED CIRCUIT PHOTOMASK PATTERNING

BACKGROUND

Semiconductor devices are used in a variety of electronic applications, such as personal computers, cell phones, digital cameras, and other electronic equipment. Integrated circuits (ICs) are made by a process that includes a design step and a subsequent fabrication step. During the design step, a layout of an IC is generated as an electronic file. The layout includes geometric shapes corresponding to structures to be fabricated on-chip. During the fabrication step, the layout is formed onto a semiconductor workpiece, for example, by sequentially depositing insulating or dielectric layers, conductive layers, and semiconductive layers of material over a semiconductor substrate, and patterning the various material layers using lithography to form circuit components and elements thereon.

As the semiconductor industry has progressed into nanometer technology process nodes, such as 5 nm nodes, in pursuit of higher device density, higher performance, and lower costs. The ever-shrinking geometry size brings challenges to IC fabrication. Improvements in this area are desired.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
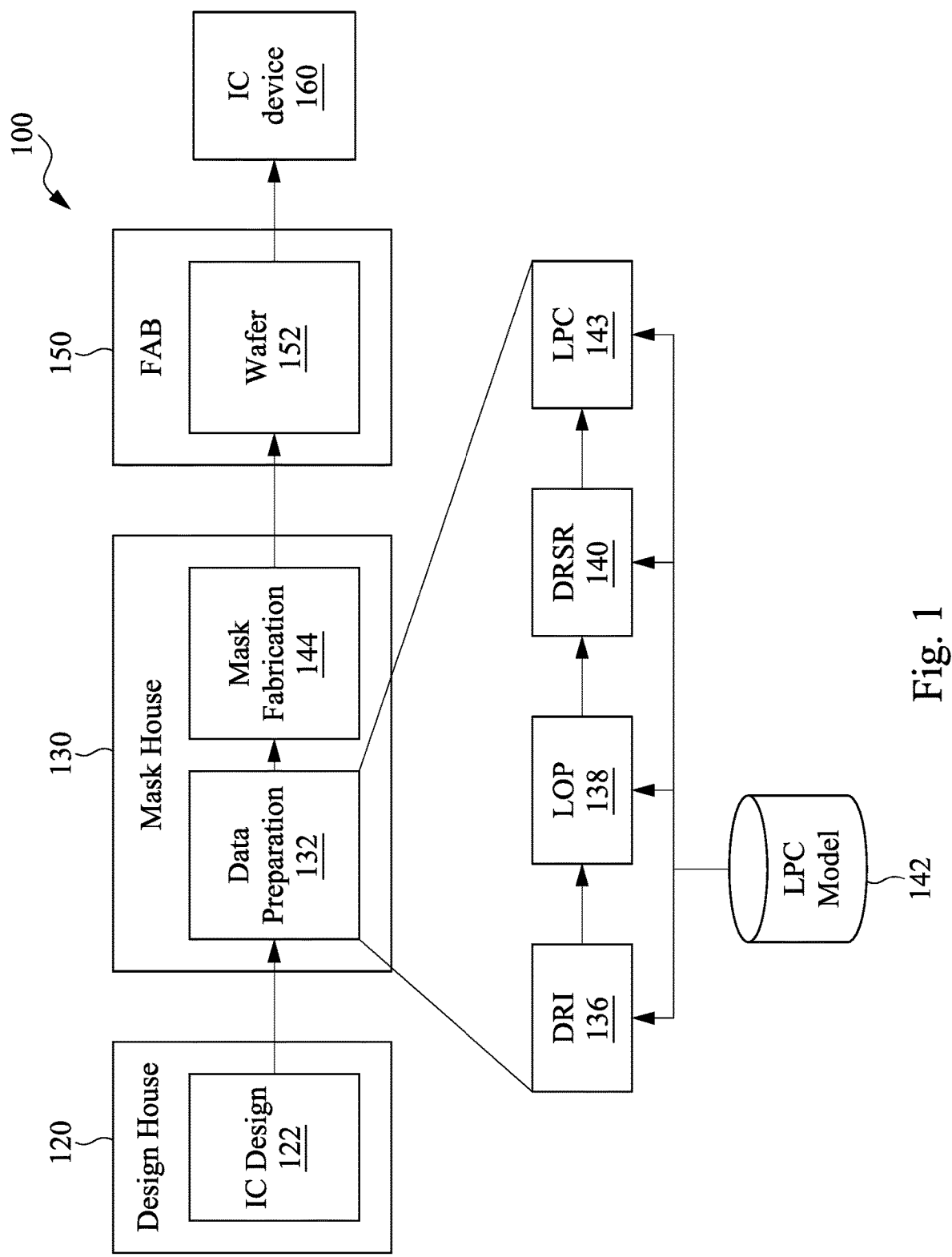
FIG. 1 is a simplified block diagram of an embodiment of an integrated circuit (IC) manufacturing system and an associated IC manufacturing flow, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "on," "top," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a simplified block diagram of an embodiment of an integrated circuit (IC) manufacturing system 100 and an IC manufacturing flow associated with the IC manufacturing system. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an integrated circuit (IC) device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. One or more of the design house 120, mask house 130, and IC manufacturer 150 may be owned by a single company, and may even coexist in a common facility and use common resources.

The design house (or design team) 120 generates an IC design layout 122. The IC design layout 122 includes various geometrical patterns designed for an IC product, based on a specification of the IC product to be manufactured. The geometrical patterns correspond to patterns of metal, oxide, or semiconductor layers that make up the various components of the IC device 160 to be fabricated. The various layers combine to form various IC features. For example, a portion of the IC design layout 122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 120 implements a proper design procedure to form the IC design layout 122. The design procedure may include logic design, physical design, and/or place and route. The IC design layout 122 is presented in one or more data files having information of the geometrical patterns. For example, the IC design layout 122 can be expressed in a GDSII file format or DFII file format.

The mask house 130 uses the IC design layout 122 to manufacture one or more masks to be used for fabricating the various layers of the IC device 160 according to the IC design layout 122. The mask house 130 performs mask data preparation 132, where the IC design layout 122 is translated into a form that can be physically written by a mask writer, and mask fabrication 144, where the design layout prepared by the mask data preparation 132 is modified to comply with a particular mask writer and/or mask manufacturer and is then fabricated. In the present embodiment, the mask data preparation 132 and mask fabrication 144 are illustrated as separate elements, however, the mask data preparation 132 and mask fabrication 144 can be collectively referred to as mask data preparation.

The mask data preparation 132 includes a dummy region insertion (DRI) 136, a logic operation (LOP) 138, a dummy region size reduction (DRSR) 140, and a lithography process checker (LPC) 143. The DRI 136 inserts dummy regions in the IC design layout 122. For example, the dummy regions include dummy features such as dummy isolation features and/or conductive features disposed away from the active features to provide a uniform thermal effect during a thermal process. In another example, dummy regions may be added to the IC design layout 122 for enhanced chemical mechanical polishing (CMP) or other processing advantages.

The LOP 138 is configured to process the IC design layout 122 in order to modify the IC design layout 122 according to specified manufacturing rules. The LOP 138 receives a set of rules representing the manufacturing constraints from various manufacturers to check the IC design layout 122. If the IC design layout 122 does not comply with the set of rules, the IC design layout 122 will be modified accordingly by the LOP 138 until the modified IC design layout 122 complies with the rules.

The DRSR 140 is configured to reduce the size of one or more dummy regions inserted by the DRI 136 in order to meet the minimum spacing required by the manufacturing rules.

The LPC 143 simulates processing that will be implemented by the IC manufacturer 150 to fabricate the IC device 160. The LPC 143 simulates this processing based on the IC design layout 122 to create a simulated manufactured device, such as the IC device 160. In one embodiment, the LPC 143 determines what shape a hypothetical photomask having a feature thus modified by the DRI 136, LOP 138, and DRSR 140 would produce on a wafer if the photomask was exposed by a photolithography tool described by the LPC models (or rules) 142. A simulated shape is called a contour. The simulated manufactured device includes simulated contours of all or a portion of the IC design layout. In some embodiments, the simulated manufactured device includes simulated contours of active regions including active features and dummy regions including dummy features. The LPC models (or rules) 142 may be based on actual processing parameters of the IC manufacturer 150. The processing parameters can include parameters associated with various processes of the IC manufacturing cycle, parameters associated with tools used for manufacturing the IC, and/or other aspects of the manufacturing process. In some embodiments, the LPC models include the minimum distance between an active region and a dummy region based on the processing parameters of the photolithography tool.

It should be understood that the above description of the mask data preparation 132 has been simplified for the purposes of clarity, and data preparation may include additional features. For example, optical proximity correction (OPC) uses lithography enhancement techniques to compensate for image errors, such as those that can arise from diffraction, interference, or other process effects. The OPC may add assist features, such as scattering bars, serif, and/or hammerheads to the IC design layout 122 according to optical models or rules such that, after a lithography process, a final pattern on a wafer is improved with enhanced resolution and precision. The mask data preparation 132 can include further resolution enhancement techniques, such as off-axis illumination, sub-resolution assist features, phase-shifting masks, other suitable techniques, or combinations thereof.

Additionally, the processes applied to the IC design layout 122 during data preparation 132 may be executed in a variety of different orders. For example, the DRI 136, LOP 138, DRSR 140, and LPC 143 may be performed in any suitable order.

After mask data preparation 132 and during mask fabrication 144, a mask or a group of masks are fabricated based on the modified IC design layout. For example, an electron-beam (e-beam) or a mechanism of multiple e-beams is used to form a pattern on a mask (photomask or reticle) based on the modified IC design layout. The mask can be formed in various technologies. In one embodiment, the mask is formed using binary technology. In the present embodiment, a mask pattern includes opaque regions and transparent regions. In some embodiments, the opaque regions correspond to the active and dummy regions, while the transparent regions correspond to a dielectric region. In some embodiments, the opaque regions correspond to a dielectric region, while the transparent regions correspond to the active and dummy regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art.

The IC manufacturer 150, such as a semiconductor foundry, uses the mask (or masks) fabricated by the mask house 130 to fabricate the IC device 160. The IC manufacturer 150 is an IC fabrication business that can include a myriad of manufacturing facilities for the fabrication of a variety of different IC products. For example, there may be a manufacturing facility for the front-end fabrication of a plurality of IC products (i.e., front-end-of-line (FEOL) fabrication), while a second manufacturing facility may provide the back-end fabrication for the interconnection and packaging of the IC products (i.e., back-end-of-line (BEOL) fabrication), and a third manufacturing facility may provide other services for the foundry business. In the present embodiment, a semiconductor wafer is fabricated using the mask (or masks) to form the IC device 160. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes.

Figure 2:
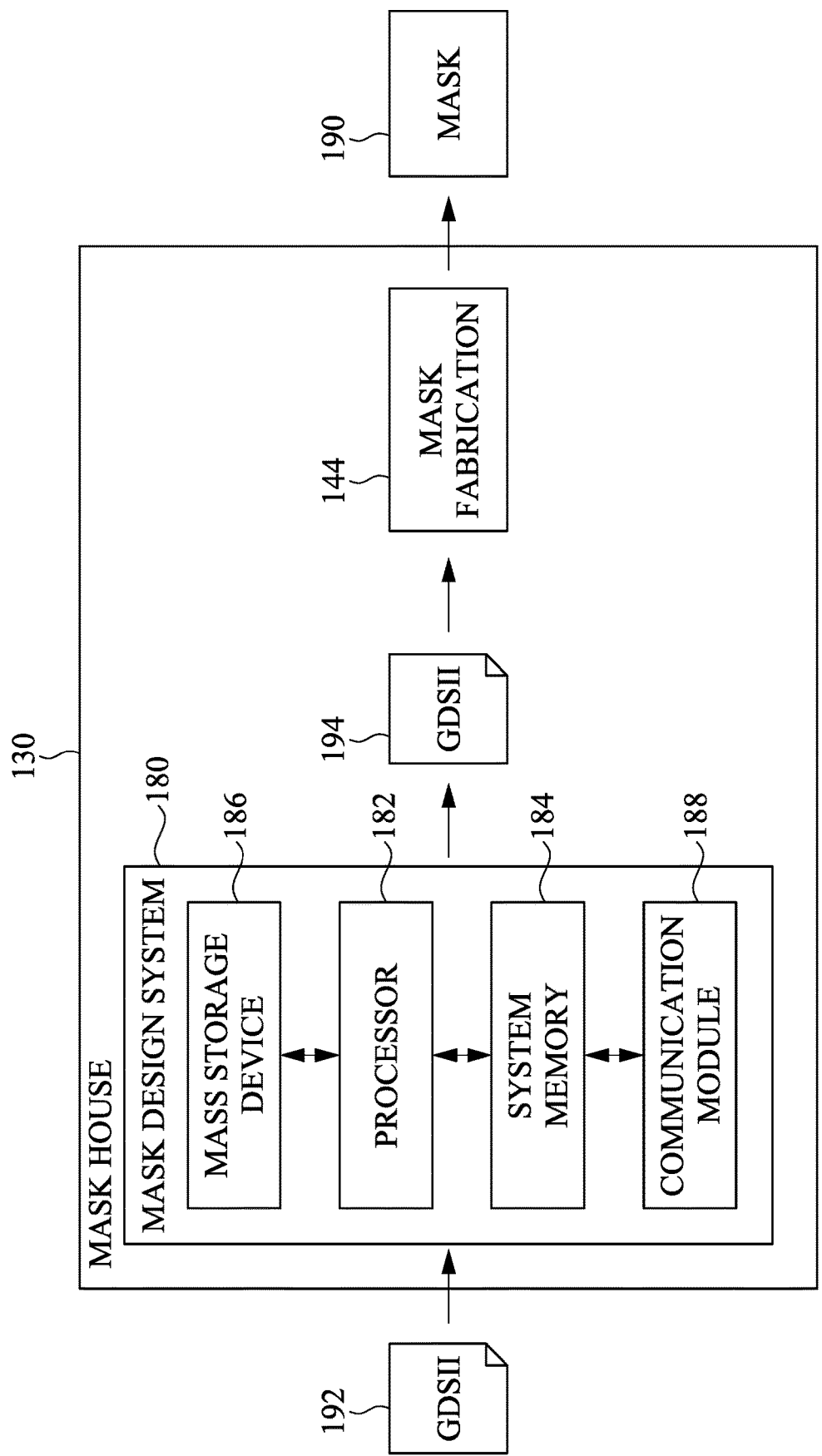
FIG. 2 is a more detailed block diagram of a mask house shown in FIG. 1, in accordance with some embodiments.

FIG. 2 is a more detailed block diagram of the mask house 130 shown in FIG. 1 according to various aspects of the present disclosure. In the illustrated embodiment, the mask house 130 includes a mask design system 180 that is operable to perform the functionality described in association with mask data preparation 132 of FIG. 1. The mask design system 180 is an information handling system such as a computer, server, workstation, or other suitable device. The system 180 includes a processor 182 that is communicatively coupled to a system memory 184, a mass storage device 186, and a communication module 188. The system memory 184 provides the processor 182 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 186. Examples of mass storage devices may include hard discs, optical disks, magneto-optical discs, solid-state storage devices, and/or a variety other mass storage devices known in the art. The communication module 188 is operable to communicate information such as IC design layout files with the other components in the IC manufacturing system 100, such as design house 120. Examples of communication modules may include Ethernet cards, 802.11 WiFi devices, cellular data radios, and/or other suitable devices known in the art.

In operation, the mask design system 180 is configured to manipulate the IC design layout 122 according to a variety of design rules and limitations before it is transferred to a mask 190 by mask fabrication 144. For example, in one embodiment, the DRI 136, LOP 138, DRSR 140, and LPC 143 may be implemented as software instructions executing on the mask design system 180. In such an embodiment, the mask design system 180 receives a first GDSII file 192 containing the IC design layout 122 from the design house 120. After the mask data preparation 132 is complete, the mask design system 180 transmits a second GDSII file 194 containing a modified IC design layout to mask fabrication 144. In alternative embodiments, the IC design layout may be transmitted between the components in IC manufacturing system 100 in alternate file formats such as DFII, CIF, OASIS, or any other suitable file type. Further, the mask design system 180 and the mask house 130 may include additional and/or different components in alternative embodiments.

Figure 3:
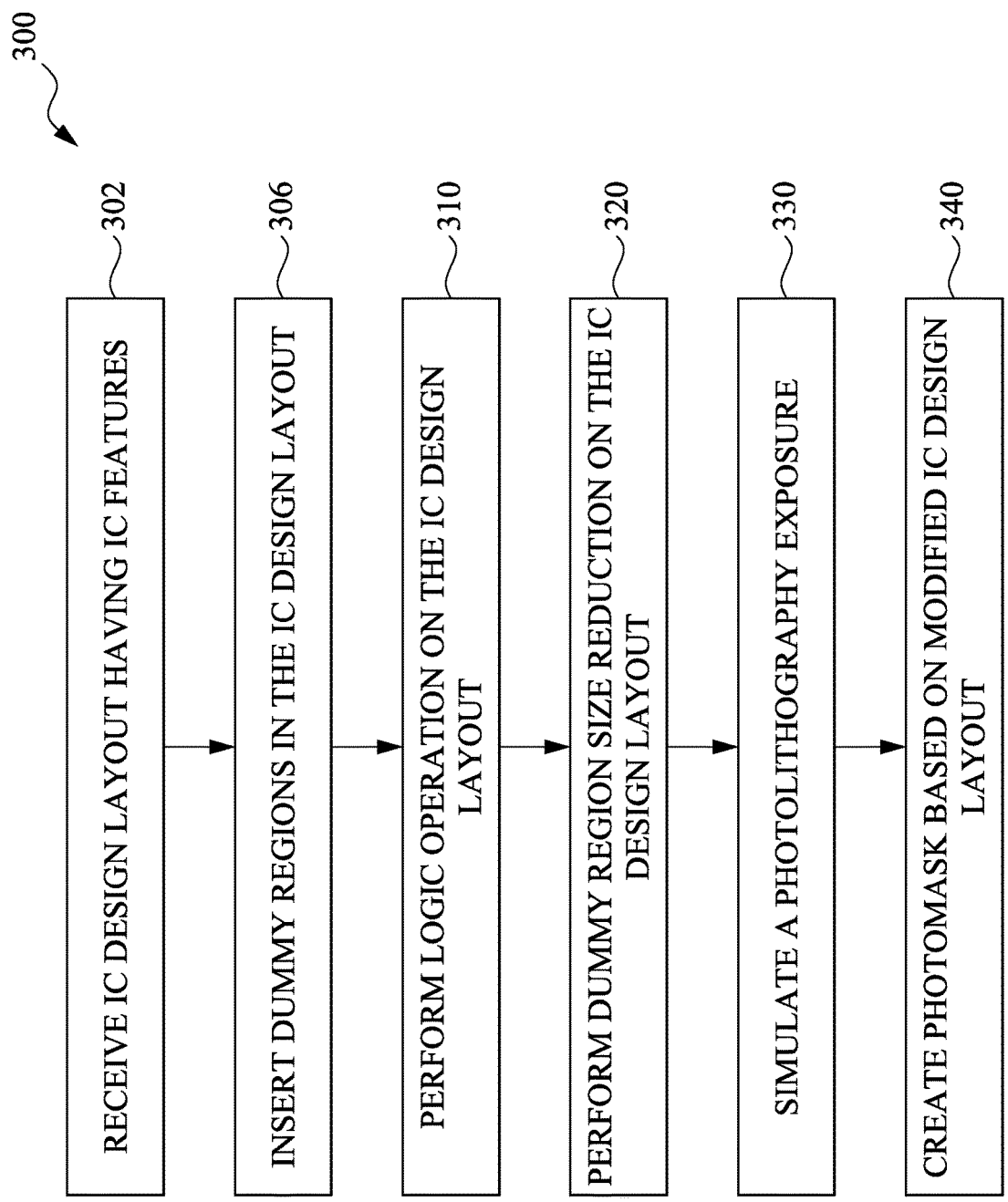
FIG. 3 is a high-level flowchart of a method of modifying an IC design layout before mask fabrication, in accordance with some embodiments.

FIG. 3 is a high-level flowchart of a method 300 of modifying an IC design layout before mask fabrication according to various aspects of the present disclosure. In one embodiment, the method 300 may be implemented in the mask data preparation 132 of mask house 130 shown in FIG. 1. The method 300 begins at operation 302 where the mask house 130 receives the IC design layout 122. The IC design layout 122 includes various geometrical patterns representing features of an integrated circuit. For example, the IC design layout 122 may include main IC features such as active regions, gate electrodes, sources and drains, metal lines, interlayer interconnection vias, and openings for bonding pads that may be formed in a semiconductor substrate (such as a silicon wafer) and various material layers disposed over the semiconductor substrate. The IC design layout 122 may also include certain assist features, such as those features for imaging effect, processing enhancement, and/or mask identification information.

At operation 306, dummy regions are inserted in the IC design layout 122. The dummy regions may be inserted by any process, such as the DRI 136. The DRI 136 insert dummy regions between active regions, and the distance between the dummy region and the adjacent active region meets the minimum distance based on the processing parameters of the photolithography tool.

The method 300 next proceeds to operation 310 where a logic operation, such as the LOP 138, is performed on the IC design layout 122. In some embodiments, additional operations, such as the OPC, may be also performed. In general, the OPC is utilized to modify the shape of an IC feature to compensate for diffraction or other process effects so that the shape of the feature as formed in the final integrated circuit closely matches the shape of the feature in the IC design layout 122. In some embodiments, after the LOP 138 and/or the OPC is performed on the IC design layout 122, the distance between the active region and the dummy region may be less than the minimum distance based on the processing parameters of the photolithography tool. In other words, the shape of the active region or the dummy region may be modified by the LOP 138 and/or the OPC, and the distance between the active region and the dummy region is reduced as a result of the modification of the shape(s) of the active region and/or the dummy region.

Figure 4B:
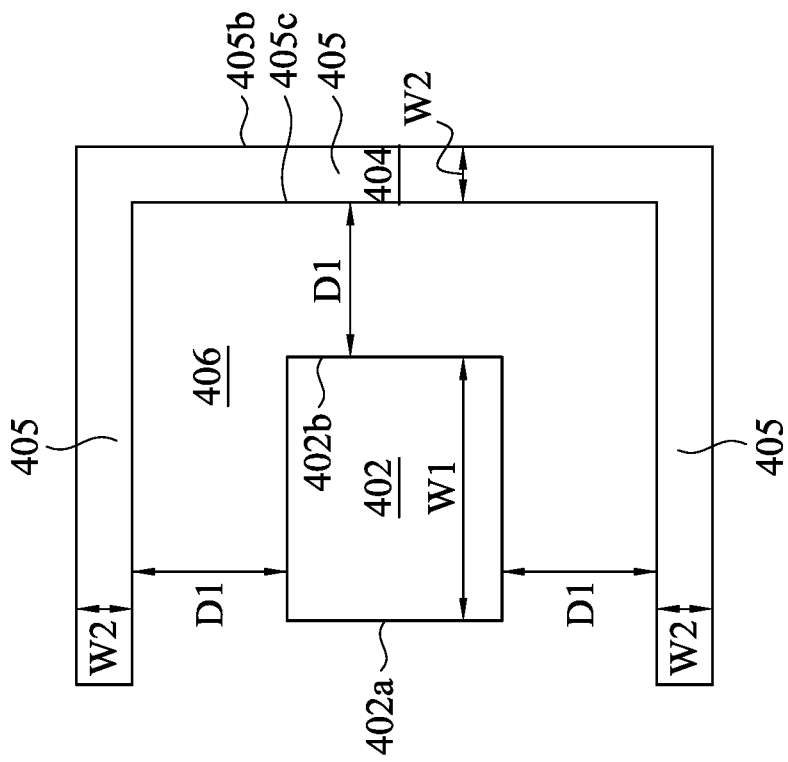
FIGS. 4A and 4B illustrate an IC feature mask creation, in accordance with some embodiments.
Figure 4A:
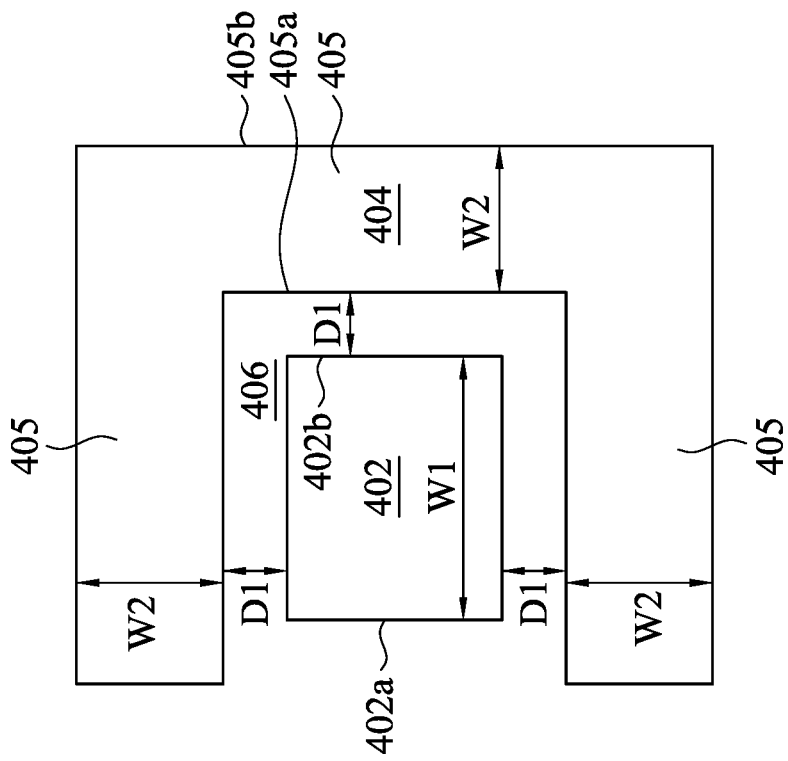

FIGS. 4A and 4B illustrate an IC feature mask creation, in accordance with some embodiments. As shown in FIG. 4A, the LOP 138 and/or OPC is performed on the IC design layout 122 including at least an active region 402 and/or a dummy region 404. The active region 402 may include transistors, memory cells, and/or conductive features, and the features in the active region 402 may be electrically connected to a power source. The dummy region 404 may include dummy transistors, dummy memory cells, and/or dummy conductive features, and the features in the dummy region 404 may not be electrically connected to a power source. A dielectric region 406 is disposed between the active region 402 and the dummy region 404. In some embodiments, the dummy region 404 has a rectangular shape and is disposed adjacent to one side of the active region 402 with the dielectric region 406 disposed therebetween. In some embodiments, the dummy region 404 includes multiple rectangular portions that surround two or more sides of the active region 402. As shown in FIG. 4A, in one embodiment, the dummy region 404 includes three portions 405 surrounding three sides of the active region 402. In some embodiments, the dummy region 404 includes four portions 405 surrounding all four sides of the active region 402. The active region 402 may have a rectangular or square shape.

As described above, the IC design layout 122 is used to manufacture one or more masks. The mask pattern includes opaque regions and transparent regions. In some embodiments, the opaque regions correspond to the active region 402 and the dummy region 404, while the transparent regions correspond to the dielectric region 406. In some embodiments, the transparent regions correspond to the active region 402 and the dummy region 404, while the opaque regions correspond to the dielectric region 406.

As described above, the features in the dummy region 404 are utilized to provided processing advantages, such as thermal uniformity and/or CMP enhancement. In one example, without the dummy region 404, the dimensions of the dielectric region 406 would be substantially larger than the dimensions of the active region 402. The dielectric region 406 includes a dielectric material, and the active region 402 includes semiconductor materials, electrically conductive materials, and dielectric materials. As a result, dishing may occur during a CMP process due to the substantially large dielectric material of the dielectric region 406. In order to balance the materials during the CMP process, the dummy region 404 is utilized.

In some embodiments, after the operation 310 of the method 300 shown in FIG. 3, the dimensions of the active region 402 and/or the dimensions of the dummy region 404 is enlarged. As a result, the distance D1 between the active region 402 and the dummy region 404 is reduced. In other words, the dimension of a portion of the dielectric region 406 between the active region 402 and the dummy region 404 is reduced. In some embodiments, the distance D1 is reduced to a value less than the minimum distance required by the manufacturing rules. In one example, the distance D1 is less than the minimum feature size to be patterned by the photolithography tool. In some embodiments, the distance D1 is less than about 20 nm, such as from about 10 nm to about 15 nm.

The dimensions of the active region 402 and the dummy region 404 are substantially larger than the dimensions of the dielectric region 406. In some embodiments, the active region 402 has a width W1 in the micron range, the portion 405 of the dummy region 404 has a width W2 in the micron range, and the distance D1 between the active region 402 and the portion 405 of the dummy region 404 is in the nanometer range. The widths W1 and W2 and the distance D1 are all in the same direction. For example, in some embodiments, the active region 402 has a first side 402a and a second side 402b opposite the first side 402a. The width W1 is measured from the first side 402a to the second side 402b. The portion 405 of the dummy region 404 disposed adjacent the second side 402b of the active region 402 has a first side 405a facing the second side 402b of the active region 402 and a second side 405b opposite the first side 405a. The width W2 is measured from the first side 405a to the second side 405b. The distance D1 is measured from the second side 402b of the active region 402 to the first side 405a of the portion 405 of the dummy region 404.

In some embodiments, the width W2 of the portion 405 of the dummy region 404 is at least about two orders of magnitude greater than the distance D1 between the active region 402 and the portion 405 of the dummy region 404. For example, in some embodiments, the distance D1 ranges from about 10 nm to about 15 nm, and the width W2 ranges from about 1 micron to about 9 microns, which is about two orders of magnitude greater than the distance D1. In some embodiments, the width W2 ranges from about 10 microns to about 99 microns, which is about three orders of magnitude greater than the distance D1. The substantially larger width W2 of the portion 405 of the dummy region 404 enables the processing advantages described above. In some embodiments, other portions 405 of the dummy region 404 may also have the width W2, which is also substantially larger than the distance D1 from the side of the portion 405 adjacent the active region 402 to the side of the active region 402 adjacent the portion 405, as shown in FIG. 4A.

Referring to FIG. 3, the method 300 next proceeds to operation 320 where the size of the dummy region 404 (FIG. 4A) is reduced. In some embodiments, the DRSR 140 (FIG. 1) is performed on the IC design layout 122 to reduce the size of one or more dummy regions 404 (FIG. 4A). Referring to FIG. 4B, the size of the dummy region 404 is reduced. For example, the width W2 of each portion 405 of the dummy region 404 is reduced. As a result, the distance D1 between the sides and the corresponding portion 405 of the dummy region 404 is increased. In some embodiments, the distance D1 is increased to a value greater than the minimum distance required by the manufacturing rules. For example, the distance D1 after the DRSR 140 is substantially greater than the minimum feature size to be patterned by the photolithography tool. In some embodiments, the distance D1 after DRSR 140 is greater than about 20 nm, such as from about 20 nm to about 50 nm.

FIG. 4B emphasizes that the distance D1 is increased while the width W2 of the portions 405 of the dummy region 404 is decreased, and FIG. 4B is not drawn to scale. As shown in FIG. 4B, the portion 405 disposed adjacent the second side 402b of the active region 402 has a first side 405c and the second side 405b opposite the first side 405c. The width W2 is measured from the first side 405c to the second side 405b. The distance D1 is measured from the second side 402b of the active region 402 to the first side 405c of the portion 405 of the dummy region 404. The width W2 is still substantially greater than the distance D1 after the DRSR 140. As described above, the width W2 may be at least about two orders of magnitude greater than the distance D1 prior to the DRSR 140. After the DRSR 140, the width W2 remains to be at least about two orders of magnitude greater than the distance D1 in order to maintain the processing advantages such as thermal uniformity and/or CMP enhancement.

In some embodiments, after the DRSR 140, other portions 405 of the dummy region 404 may also have the width W2, which is also substantially larger than the distance D1 from the side of the portion 405 adjacent the active region 402 to the side of the active region 402 adjacent the portion 405, as shown in FIG. 4B.

Referring back to FIG. 3, the method 300 proceeds to operation 330 where a photolithography simulation, such as the LPC 143 is performed on the IC design layout 122 modified by the operations 306, 310, and 320 to generate simulated contours. Next, the method 300 finishes at operation 340 where the IC design layout 122 modified by the operations 306, 310, and 320 is saved to the GDSII file 194 (FIG. 2) and transferred to mask fabrication 144 (FIG. 2), where the IC design layout 122 is formed on the mask 190 (FIG. 2).

It is understood that the method 300 of modifying the IC design layout 122 before mask fabrication of the illustrated embodiment is simply an example and in alternative embodiments, additional and/or different steps may be included in the method 300.

Further, the method 300 of modifying the IC design layout 122 before mask fabrication of the illustrated embodiment is designed to be executed on any computing architecture, such as the mask design system 180 described in association with FIG. 2. For example, the method 300 may be executed on a single computer, local area networks, client-server networks, wide area networks, internets, hand-held and other portable and wireless devices and networks. Such architecture can take the form of an entirely hardware embodiment, an entirely software embodiment, or an embodiment containing both hardware and software elements. Hardware generally includes at least processor-capable platforms, such as client-machines (also known as personal computers or servers), and hand-held processing devices (such as smart phones, personal digital assistants (PDAs), or personal computing devices (PCDs), for example. Hardware can include any physical device that is capable of storing machine-readable instructions, such as memory or other data storage devices. Other forms of hardware include hardware subsystems, including transfer devices such as modems, modem cards, ports, and port cards, for example. Software generally includes any machine code stored in any memory medium, such as RAM or ROM, and machine code stored on other devices (such as floppy disks, flash memory, or a CDROM, for example). Software can include source or object code, for example. In addition, software encompasses any set of instructions capable of being executed in a client machine or server.

Furthermore, embodiments of the present disclosure can take the form of a computer program product accessible from a tangible computer usable or computer readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium. For example, operations of the method 300 may be in the form of computer executable code stored in a computer readable medium.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The present disclosure provides methods to modify an IC design layout for mask patterning. In some embodiments, the method includes inserting dummy regions in an IC design layout, perform one or more operations on the IC design layout that results in a reduction in distance between an active region and a dummy region, and perform a dummy region size reduction on the IC design layout to increase the distance between the active region and the dummy region. Some embodiments may achieve advantages. For example, the increased distance between the active region and the dummy region may satisfy manufacturing rules, such as meeting the minimum feature size to be patterned by the photolithography tool. As a result, failure of the IC design layout by the lithography process checker is reduced.

An embodiment is a method. The method includes inserting a dummy region in an integrated circuit (IC) design layout. The IC design layout includes an active region, and the active region and the dummy region is separated by a first distance. The method further includes performing one or more operations on the IC design layout, and the active region and the dummy region is separated by a second distance substantially less than the first distance as a result of the one or more operations. The method further includes performing a dummy region size reduction on the IC design layout to increase the second distance to a third distance substantially greater than the second distance, and the third distance is substantially greater than a minimum feature size to be patterned by a photolithography tool. The method further includes forming a photomask using the IC design layout, and the photomask is to be used in the photolithography tool.

Another embodiment is a system. The system includes a processor configured to execute instructions, and the instructions include to insert a dummy region in an integrated circuit (IC) design layout, the IC design layout includes an active region, and the active region and the dummy region is separated by a first distance. The instructions further to include perform one or more operations on the IC design layout, and the active region and the dummy region is separated by a second distance substantially less than the first distance as a result of the one or more operations. The system further includes to perform a dummy region size reduction on the IC design layout to increase the second distance to a third distance substantially greater than the second distance, and the third distance is substantially greater than a minimum feature size to be patterned by a photolithography tool.

A further embodiment is a computer readable medium having computer executable code stored thereon. The computer readable medium includes code for inserting a dummy region in an integrated circuit (IC) design layout. The IC design layout includes an active region, and the active region and the dummy region is separated by a first distance. The computer readable medium further includes code for performing one or more operations on the IC design layout. The active region and the dummy region is separated by a second distance substantially less than the first distance as a result of the one or more operations. The computer readable medium further includes code for performing a dummy region size reduction on the IC design layout to increase the second distance to a third distance substantially greater than the second distance. The third distance is substantially greater than a minimum feature size to be patterned by a photolithography tool.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A method, comprising:
    inserting a dummy region in an integrated circuit (IC) design layout, wherein the IC design layout includes an active region, and the active region and the dummy region is separated by a first distance;
    performing one or more operations on the IC design layout, wherein the active region and the dummy region is separated by a second distance less than the first distance as a result of the one or more operations, wherein the one or more operations comprise an optical proximity correction (OPC) process; then
    performing a dummy region size reduction on the IC design layout to increase the second distance to a third distance greater than the second distance, wherein the third distance is greater than a minimum feature size to be patterned by a photolithography tool; and forming a photomask using the IC design layout, wherein the photomask is to be used in the photolithography tool.

2. The method of claim 1, wherein the dummy region size reduction comprises reducing a portion of the dummy region from a first width to a second width.

3. The method of claim 2, wherein the second width extends from a first side of the portion of the dummy region to a second side of the portion of the dummy region, and the first side of the portion of the dummy region faces a first side of the active region.

4. The method of claim 3, wherein the second width is at least about two orders of magnitude greater than the first distance.

5. The method of claim 1, wherein the one or more operations comprises a logic operation.

6. The method of claim 1, wherein the dummy region surrounds at least two sides of the active region.

7. The method of claim 1, wherein the dummy region surrounds three sides of the active region.

8. A system for designing a photomask, comprising:
a processor configured to execute instructions, wherein the instructions comprise:
to insert a dummy region in an integrated circuit (IC) design layout, wherein the IC design layout includes an active region, and the active region and the dummy region is separated by a first distance;
to perform one or more operations on the IC design layout, wherein the active region and the dummy region is separated by a second distance less than the first distance as a result of the one or more operations, wherein the one or more operations comprise an optical proximity correction (OPC) process; and then
to perform a dummy region size reduction on the IC design layout to increase the second distance to a third distance greater than the second distance, wherein the third distance is greater than a minimum feature size to be patterned by a photolithography tool.

9. The system of claim 8, wherein the dummy region size reduction comprises reducing a portion of the dummy region from a first width to a second width.

10. The system of claim 9, wherein the second width extends from a first side of the portion of the dummy region to a second side of the portion of the dummy region, and the first side of the portion of the dummy region faces a first side of the active region.

11. The system of claim 10, wherein the second width is at least about two orders of magnitude greater than the first distance.

12. The system of claim 8, wherein the one or more operations comprises a logic operation.

13. The system of claim 8, wherein the dummy region surrounds at least two sides of the active region.

14. The system of claim 8, wherein the dummy region surrounds three sides of the active region.

15. A computer readable medium having computer executable code stored thereon, comprising:
code for inserting a dummy region in an integrated circuit (IC) design layout, wherein the IC design layout includes an active region, and the active region and the dummy region is separated by a first distance;
code for performing one or more operations on the IC design layout, wherein the active region and the dummy region is separated by a second distance less than the first distance as a result of the one or more operations, wherein the one or more operations comprise an optical proximity correction (OPC) process; and then
code for performing a dummy region size reduction on the IC design layout to increase the second distance to a third distance greater than the second distance, wherein the third distance is greater than a minimum feature size to be patterned by a photolithography tool.

16. The computer readable medium of claim 15, wherein the dummy region size reduction comprises reducing a portion of the dummy region from a first width to a second width.

17. The computer readable medium of claim 16, wherein the second width extends from a first side of the portion of the dummy region to a second side of the portion of the dummy region, and the first side of the portion of the dummy region faces a first side of the active region.

18. The computer readable medium of claim 17, wherein the second width is at least about two orders of magnitude greater than the first distance.

19. The computer readable medium of claim 15, wherein the one or more operations comprises a logic operation.

20. The computer readable medium of claim 15, wherein the dummy region surrounds at least two sides of the active region.

* * * * *